(12) United States Patent
Niino et al.

(10) Patent No.: US 12,497,433 B2
(45) Date of Patent: Dec. 16, 2025

(54) FLUORESCENT PROTEIN AND UTILIZATION THEREOF

(71) Applicant: RIKEN, Saitama (JP)

(72) Inventors: Yusuke Niino, Saitama (JP); Atsushi Miyawaki, Saitama (JP)

(73) Assignee: RIKEN, Saitama (JP)

( * ) Notice: Subject to any disclaimer, the term of this patent is extended or adjusted under 35 U.S.C. 154(b) by 927 days.

(21) Appl. No.: 17/765,466

(22) PCT Filed: Oct. 2, 2020

(86) PCT No.: PCT/JP2020/037578
§ 371 (c)(1),
(2) Date: Mar. 31, 2022

(87) PCT Pub. No.: WO2021/066157
PCT Pub. Date: Apr. 8, 2021

(65) Prior Publication Data
US 2022/0380419 A1    Dec. 1, 2022

(30) Foreign Application Priority Data
Oct. 4, 2019 (JP) .................................. 2019-183930

(51) Int. Cl.
*C07K 14/435* (2006.01)
*G01N 33/542* (2006.01)

(52) U.S. Cl.
CPC ..... *C07K 14/43595* (2013.01); *G01N 33/542* (2013.01); *C07K 2319/00* (2013.01)

(58) Field of Classification Search
CPC .......... C07K 14/43595; C07K 2319/00; C07K 2319/60; G01N 33/542; C12N 15/65
See application file for complete search history.

(56) References Cited

U.S. PATENT DOCUMENTS

| | | | |
|---|---|---|---|
| 2003/0017538 A1 | 1/2003 | Miyawaki et al. | |
| 2009/0017516 A1 | 1/2009 | Nagai et al. | |
| 2010/0184116 A1 | 7/2010 | Miyawaki et al. | |

FOREIGN PATENT DOCUMENTS

| | | |
|---|---|---|
| EP | 1264888 A2 | 12/2022 |
| JP | 2002-369690 | 12/2002 |
| WO | WO 2006/068187 | 6/2006 |
| WO | 2021/081404 A1 | 4/2021 |

OTHER PUBLICATIONS

European Search Report For EP Patent Application No. 20871801.5, dated Aug. 14, 2023, 6 pages.
Office Action For JP Patent Application No. 2021-551490, dated Oct. 15, 2024, 4 pages.
Evdokimov, A.G.et al., Structural basis for the fast maturation of Arthropoda green fluorescent protein, EMBO reports, 2006, vol. 7, No. 10, p. 1006-1012.
Sawano, A. and Miyawaki, A., Directed evolution of green fluorescent protein by a new versatile PCR strategy for site-directed and semi-random mutagenesis, Nucleic Acids Research, 2000, vol. 28, No. 16, e78, p. 1-7.
Zapata-Hommer, O. and Griesbeck, O., Efficiently folding and circularly permuted variants of the sapphire mutant of GFP, BMC Biotechnology, 2003, vol. 3, Article No. 5, p. 1-6.
Cotlet, M. et al., Time-resolved detection of the one-and two-photon . . . , Proceedings of SPIE, 2006, vol. 6092, p. 609204-1-629204-10.
English translation of International preliminary report on patentability of PCT/JP2020/037578, dated Dec. 8, 2020, 6 pages.
International Search Report for PCT/JP2020/037578, dated Dec. 8, 2020, 3 pages.

*Primary Examiner* — Kimberly Ballard
*Assistant Examiner* — Stacey N Macfarlane
(74) *Attorney, Agent, or Firm* — Casimir Jones, S.C.; Robert A. Goetz (57) ABSTRACT

A fluorescent protein of the present invention has an amino acid sequence of a green fluorescent protein (GFP) derived from a crystal jelly or of a mutant fluorescent protein of the green fluorescent protein, the amino acid sequence having an amino acid residue (alanine residue) substituted with a phenylalanine residue, the amino acid residue corresponding to position 206 with the amino acid sequence of the GFP used as a reference sequence.

10 Claims, 3 Drawing Sheets
Specification includes a Sequence Listing.

FLUORESCENT PROTEIN AND UTILIZATION THEREOF

TECHNICAL FIELD

The present invention relates to a novel mutant of a fluorescent protein and a use thereof.

BACKGROUND ART

Fluorescent proteins are an indispensable tool for visualizing a cell, tissue, individual organism, or the like. The inventors of the present invention have introduced a mutation into a crystal jelly-derived fluorescent protein so as to develop a fluorescent protein having a greater maturation speed (Non-patent Literature 1).

CITATION LIST

Non-Patent Literature

[Non-patent Literature 1]
Nagai et al., Nat Biotechnol. 2002 January; 20(1): 87-90

SUMMARY OF INVENTION

Technical Problem

Note, however, that maturation of a conventional fluorescent protein requires approximately one hour at the earliest for translation of mRNA into a protein and acquisition of a fluorescence characteristic by the protein. Thus, a fluorescent protein leaves room for further improvement in order to (i) follow an in vivo phenomenon in which an expression cycle is a short period of time (e.g., two to three hours) and (ii) visualize the in vivo phenomenon.

An aspect of the present invention has an object to achieve a fluorescent protein that has a great maturation speed.

Solution to Problem

In order to attain the object, the present invention includes aspects described below.

A fluorescent protein having an amino acid sequence of a green fluorescent protein (GFP) derived from a crystal jelly or of a mutant fluorescent protein of the green fluorescent protein, the amino acid sequence having an amino acid residue substituted with a phenylalanine residue (alanine residue), the amino acid residue corresponding to position 206 with the amino acid sequence of the GFP used as a reference sequence.

Advantageous Effects of Invention

An aspect of the present invention makes it possible to achieve a fluorescent protein that has a great maturation speed.

DESCRIPTION OF EMBODIMENTS

Definitions of Terms Etc.

The term "polynucleotide" is herein interchangeable with "nucleic acid" or "nucleic acid molecule", and intends to refer to a nucleotide polymer. The term "base sequence" is interchangeable with "nucleic acid sequence" or "nucleotide sequence", and intends to refer to a deoxyribonucleotide sequence or a ribonucleotide sequence unless otherwise indicated. The polynucleotide may have a single-stranded structure or a double-stranded structure, and may be a sense strand or an antisense strand in the case of a single strand.

The term "protein" is herein interchangeable with "polypeptide".

A protein as used herein only needs to be a polypeptide formed by peptide linkage of amino acids, but is not limited to this. The protein may include a structure different from a polypeptide. The structure different from a polypeptide is herein exemplified by a carbohydrate and an isoprenoid group, but is not particularly limited.

The term "crystal jelly" herein intends to refer to a jellyfish belonging to the Aequorea family, such as *Aequorea victoria*.

The term "fluorescence characteristic" herein refers to having at least one characteristic among, for example, an excitation wavelength, fluorescence intensity, fluorescence velocity, fluorescence stability, pH sensitivity, a molar extinction coefficient, fluorescence quantum efficiency, excitation spectrum shape or emission spectrum shape, an excitation wavelength maximum, an emission wavelength maximum, an excitation amplitude ratio between two different wavelengths, an emission amplitude ratio between two different wavelengths, and an excited-state lifetime. The fluorescence intensity is numerically expressed by using, as an indicator, intensity of fluorescence-emitting light, and means fluorescence brightness that is proportional to a light absorption efficiency (i.e., extinction coefficient) and a conversion efficiency (i.e., quantum yield) between excitation light and fluorescence. The fluorescence velocity means a value obtained by numerically expressing velocity as measured during a period in which excitation light is received and then a fixed fluorescence intensity is reached. The fluorescence stability means a characteristic possessed by a fluorescent polypeptide and determined by using, as an indicator, a time during which a fixed fluorescence intensity is maintained. Specifically, a smaller degree of attenuation of fluorescence during a certain period of elapsed time means higher fluorescence stability.

The expression "A and/or B" is herein a concept covering both "A and B" and "A or B", and is herein interchangeable with "at least one of A and B".

The expression "amino acid mutation" is herein used as a collective term for substitution, deletion, insertion, and/or addition of amino acids.

A number indicating a position of an amino acid residue in an amino acid sequence is herein shown by using, as a reference sequence, an amino acid sequence (SEQ ID NO: 5) of a green fluorescent protein (GFP) derived from a crystal jelly, unless otherwise specified. Specifically, the expression "amino acid residue corresponding to position Y" herein refers to the Yth amino acid residue in the amino acid sequence of the GFP unless otherwise specified. In an amino acid sequence of a mutant fluorescent protein of the GFP, the expression "amino acid residue corresponding to position Y" refers to an amino acid that is identified, by homology analysis, as corresponding to position Y in the amino acid sequence of the GFP, unless otherwise specified. Examples of a method of carrying out the homology analysis include methods carried out by pairwise sequence alignment, such as the Needleman-Wunsch method and the Smith-Waterman method, and methods carried out by multiple sequence alignment, such as the ClustalW method. In accordance with such a method, a person skilled in the art would be able to use an amino acid sequence of a GFP as a reference sequence to understand a "corresponding amino acid" in an amino acid sequence to be analyzed (an amino acid sequence of a mutant fluorescent protein of a GFP). The analysis may be carried out under a default setting, or may be carried out by changing a default parameter as appropriate as necessary. A specific example of the "amino acid residue corresponding to position Y" in an amino acid sequence of a mutant fluorescent protein of a GFP will be described later.

[1. Fluorescent Protein]

A fluorescent protein in accordance with an aspect of the present invention has an amino acid sequence of a green fluorescent protein (GFP) derived from a crystal jelly or of a mutant fluorescent protein of the green fluorescent protein, the amino acid sequence having an amino acid residue substituted with a phenylalanine residue (in the GFP, an alanine residue), the amino acid residue corresponding to position 206 with the amino acid sequence of the GFP used as a reference sequence. In the following description, a substitution of the alanine residue of the amino acid residue corresponding to position 206 with the phenylalanine residue is referred to as A206F. Furthermore, a substitution of X (any amino acid residue different from the phenylalanine residue) of the amino acid residue corresponding to position 206 with the phenylalanine residue is referred to as X206F.

<1> Green Fluorescent Protein (GFP) Derived from Crystal Jelly and Mutant Fluorescent Protein of the GFP For example, Prasher, D. C. et al., Gene 111: 229-233 discloses an amino acid sequence of a GFP. Examples of a mutant fluorescent protein of the GFP include a yellow fluorescent protein (YFP), an enhanced green fluorescent protein (EGFP), and a super enhanced yellow fluorescent protein (SEYFP). For example, Roger Y. Tsin, Annu. Rev. Biochem. 1998. 67: 509-44 and references thereof disclose an amino acid sequence of a GFP mutant fluorescent protein including a YFP. An amino acid sequence represented by SEQ ID NO: 1 is an example of an EGFP amino acid sequence. An amino acid sequence represented by SEQ ID NO: 2 is an example of an EYFP amino acid sequence. An amino acid sequence represented by SEQ ID NO: 3 is an example of an SEYFP amino acid sequence.

The following shows examples of a GFP, a YFP, and mutants thereof. For example, an indication of F99S shows that F (phenylalanine) is substituted with S (serine) at an amino acid residue corresponding to position 99. Other amino acid substitutions are shown by a similar indication method.

(A) Wild type GFP;
(B) GFP having amino acid mutations of F99S, M153T, and V163A;
(C) GFP having an amino acid mutation of S65T;
(D) GFP having amino acid mutations of F64L and S65T;
(E) GFP having amino acid mutations of S65T, S72A, N149K, M153T, I167T;
(F) GFP having amino acid mutations of S202F and T203I;
(G) GFP having amino acid mutations of T203I, S72A, and Y145F;
(H) GFP (YFP) having amino acid mutations of S65G, S72A, and T203F;
(I) GFP (YFP) having amino acid mutations of S65G, S72A, and T203H;
(J) GFP (EYFP-V68L, Q69K) having amino acid mutations of S65G, V68L, Q69K, S72A, and T203Y;
(K) GFP (EYFP) having amino acid mutations of S65G, S72A, and T203Y;
(L) GFP (YFP) having amino acid mutations of S65G, S72A, K79R, and T203Y;
(M) GFP (EYFP) having amino acid mutations of S65G, V68L, S72A, and T203Y;
(N) EYFP (SEYFP) having amino acid mutations of F64L, M153T, V163A, and S175G;
(O) SEYFP having an amino acid mutation of F46L (Venus: Japanese Patent No. 3829252 etc.); and
(P) GFP or a mutant thereof having at least one amino acid residue among five residues listed below. A GFP, a YFP, or a mutant thereof may be a GFP or a mutant thereof having all these five amino acid residues or having any two, three, or four of these five amino acid residues. That is, such a mutant contains no mutations of five amino acid residues that most characterize Venus.

An amino acid residue being a phenylalanine residue, the amino acid residue corresponding to position 46 with the amino acid sequence of the GFP used as the reference sequence;

An amino acid residue being a phenylalanine residue, the amino acid residue corresponding to position 64 with the amino acid sequence of the GFP used as the reference sequence;

An amino acid residue being a methionine residue, the amino acid residue corresponding to position 153 with the amino acid sequence of the GFP used as the reference sequence;

An amino acid residue being a valine residue, the amino acid residue corresponding to position 163 with the amino acid sequence of the GFP used as the reference sequence; and An amino acid residue being a serine residue, the amino acid residue corresponding to position 175 with the amino acid sequence of the GFP used as the reference sequence.

The scope of a GFP or a mutant fluorescent protein of the GFP encompasses, for example, a fluorescent protein having an amino acid sequence identity of 90% or more with respect to any of the fluorescent proteins listed above. The amino acid sequence identity is preferably 92% or more, preferably 95% or more, or may be particularly preferably 96% or more, 97% or more, 98% or more, or 99% or more. From the viewpoint of the number of "amino acid mutations", the scope of a GFP or a mutant fluorescent protein of the GFP encompasses, for example, a fluorescent protein that is included in the fluorescent proteins listed above and that has not more than 25, not more than 13, not more than 10, not more than 8, not more than 5, or not more than 3 amino acid mutations, assuming that the full length of an amino acid sequence is not more than approximately 250 amino acids. For example, a characteristic amino acid mutation possessed by any of the fluorescent proteins listed above is also maintained as it is in a fluorescent protein that is defined by the amino acid sequence identity with respect to that fluorescent protein.

<2> Amino Acid Mutation Related to Maturation of Fluorescent Protein

The following shows amino acid mutations each of which is related to maturation of a fluorescent protein and introduced into a GFP (described earlier) or a mutant fluorescent protein of the GFP. From a certain viewpoint, such an amino acid mutation is related to a reduction in maturation time of the fluorescent protein in accordance with an aspect of the present invention.

A206F (Described Earlier)

A206F is an amino acid mutation that is most related to maturation of a fluorescent protein among amino acid mutations possessed by the fluorescent protein in accordance with an aspect of the present invention.

In amino acid sequences represented by SEQ ID NOS: 1 to 3, since valine (Val) is inserted between amino acids 1 and 2, the alanine residue (Ala) at position 206 in the naturally occurring fluorescent protein (GFP) is located at position 207. The fluorescent protein in accordance with an aspect of the present invention is configured such that the alanine residue corresponding to position 206 with the amino acid sequence of the GFP used as the reference sequence is substituted with a phenylalanine residue. The expression "alanine residue at position 206" herein corresponds to the alanine residue (Ala) at position 207 in each of the amino acid sequences represented by SEQ ID NOS: 1 to 3.

Thus, the fluorescent protein in accordance with an aspect of the present invention can be, for example, a fluorescent protein having an amino acid sequence such that the alanine residue (Ala) at position 207 is substituted with a phenylalanine residue in an amino acid sequence represented by any of SEQ ID NOS: 1 to 3.

X206F (Described Earlier)

X refers to any amino acid residue different from a phenylalanine residue. X206F is an amino acid mutation that is most related to maturation of a fluorescent protein among the amino acid mutations possessed by the fluorescent protein in accordance with an aspect of the present invention. As described earlier, X is ordinarily an alanine residue, but also refers to a substitution of X with F in a case where the alanine residue is substituted with another amino acid residue X (for example, a lysine residue or the like).

S30X, Y39X, Q69X, C70X, I128X, D129X, Y145X (X Represents any Other Amino Acid)

A fluorescent protein in accordance with a preferable aspect of the present invention has not only A206F but also a mutation(s) in one, two, three, four, five, six, or seven of amino acid residues selected from the group consisting of amino acid residues corresponding to position 30, position 39, position 69, position 70, position 128, position 129, and position 145 with the amino acid sequence of the GFP used as the reference sequence.

In a preferable embodiment, the "mutation" is a substitution with another amino acid residue. The following shows specific examples of a fluorescent protein, which is a preferable embodiment. The fluorescent protein has not only A206F but also at least one amino acid residue substitution selected from the group consisting of the following (8) to (14):

(8) a substitution of an amino acid residue corresponding to position 30 of the amino acid sequence of the GFP (a serine residue) with an arginine residue (referred to as S30R)

(9) a substitution of an amino acid residue corresponding to position 39 of the amino acid sequence of the GFP (a tyrosine residue) with an isoleucine residue (referred to as Y39I)

(10) a substitution of an amino acid residue corresponding to position 69 of the amino acid sequence of the GFP (a glutamine residue) with an alanine residue (referred to as Q69A)

(11) a substitution of an amino acid residue corresponding to position 70 of the amino acid sequence of the GFP (a cysteine residue) with a valine residue (referred to as C70V)

(12) a substitution of an amino acid residue corresponding to position 128 of the amino acid sequence of the GFP (an isoleucine residue) with a serine residue (referred to as I128S)

(13) a substitution of an amino acid residue corresponding to position 129 of the amino acid sequence of the GFP (an aspartic acid residue) with a glycine residue (referred to as D129G)

(14) a substitution of an amino acid residue corresponding to position 145 of the amino acid sequence of the GFP (a tyrosine residue) with a phenylalanine residue (referred to as Y145F)

The amino acid residues at position 30, position 39, position 69, position 70, position 128, position 129, and position 145 in the naturally occurring fluorescent protein (GFP) correspond to the amino acid residues at position 31, position 40, position 70, position 71, position 129, position 130, and position 146, respectively, in the amino acid sequences represented by SEQ ID NOS: 1 to 3.

The fluorescent protein in accordance with an aspect of the present invention is configured such that a time from when mRNA is translated into a protein to when the protein acquires a fluorescence characteristic (a maturation time of the fluorescent protein) is, for example, less than 1 hour, preferably not more than 0.9 hours, not more than 0.8 hours, not more than 0.7 hours, not more than 0.6 hours, or not more than 0.5 hours. The fluorescent protein in accordance with an aspect of the present invention has a shorter maturation time as compared with (a) a GFP into which the amino acid mutation described earlier in the section "<2> Amino acid mutation related to maturation of fluorescent protein" has not been introduced or (b) a mutant fluorescent protein of the GFP. For example, the maturation time of the fluorescent protein in accordance with an aspect of the present invention is reduced by not less than 10%, not less than 20%, not less than 30%, not less than 40%, or not less than 50% by introducing, into the fluorescent protein, the amino acid mutation described earlier in the section "<2> Amino acid mutation related to maturation of fluorescent protein". The maturation time of the fluorescent protein is, for example, "a time required for brightness of the fluorescent protein to reach 50% of its final brightness". As shown in Examples, a time from when mRNA is translated into a protein to when the protein acquires fluorescence (a maturation time of the fluorescent protein) is approximately 30 minutes and is therefore greatly reduced as compared with the case of a conventional fluorescent protein. The maturation time that is approximately 30 minutes allows the fluorescent protein in accordance with an aspect of the present invention to be used to (i) follow an in vivo phenomenon in which an expression cycle is a short period of time (e.g., two to three hours) and (ii) visualize the in vivo phenomenon. Examples of the in vivo phenomenon in which an expression cycle is a short period of time include gene expression oscillation during segmentation and gene expression oscillation before and after differentiation of a neural stem cell. The fluorescent protein in accordance with an aspect of the present invention is equivalent in fluorescence characteristic except the maturation time to (a) a GFP into which the amino acid mutation described earlier in the section "<2> Amino acid mutation related to maturation of fluorescent protein" has not been introduced or (b) a mutant fluorescent protein of the GFP.

[2. Polynucleotide]

A polynucleotide in accordance with an aspect of the present invention encodes the fluorescent protein in accordance with an aspect of the present invention. A specific example of the polynucleotide in accordance with an aspect of the present invention is specifically a polynucleotide defined in any one of (A) to (E) below.

(A) a polynucleotide encoding a fluorescent protein in which an amino acid residue corresponding to position 206 is substituted with a phenylalanine residue in an amino acid sequence of a GFP or a mutant fluorescent protein of the GFP (B) a polynucleotide encoding a fluorescent protein in which the amino acid sequence defined in (A) above is an amino acid sequence represented by any of SEQ ID NOS: 1 to 3 and 5

(C) a polynucleotide encoding a fluorescent protein in which the amino acid sequence defined in (A) above is an amino acid sequence having a sequence identity of 90% or more with respect to the amino acid sequence represented by any of SEQ ID NOS: 1 to 3 and 5

(D) a polynucleotide encoding a fluorescent protein that has, in the fluorescent protein defined in any of (A) to (C) above, one, two, three, four, or five of amino acid residues selected from the group consisting of (3) to (7) above (E) a polynucleotide encoding a fluorescent protein that has, with respect to an amino acid sequence of the fluorescent protein defined in any of (A) to (C) above, a substitution of at least one amino acid residue selected from the group consisting of (8) to (14) above The polynucleotide in accordance with an aspect of the present invention may be present in the form of an RNA or a DNA. The form of an RNA is, for example, mRNA. The form of a DNA is, for example, cDNA or genomic DNA. The DNA may be double-stranded or single-stranded.

A method for obtaining (isolating) the polynucleotide in accordance with an aspect of the present invention is not particularly limited. For example, the polynucleotide in accordance with an aspect of the present invention may be synthesized by a nucleic acid synthesis method such as a phosphoramidite method.

The polynucleotide in accordance with an aspect of the present invention may be obtained by, for example, a method that involves nucleic acid amplification such as PCR. An example method involves (i) preparing a primer from each of a 5' side and a 3' side of a sequence (or complementary sequences thereof) of cDNA of the polynucleotide, (ii) performing, for example, PCR by using the above primers with genomic DNA, cDNA, or the like as a template, and (iii) amplifying a DNA region between the two primers. This method allows a DNA fragment containing the polynucleotide in accordance with an aspect of the present invention to be obtained in a large amount.

[3. Recombinant Vector]

The polynucleotide in accordance with an aspect of the present invention (for example, DNA) can be used as a recombinant vector inserted into a suitable vector. The vector may be of a kind such that the vector replicates independently (for example, a plasmid), or such that the vector is integrated into a genome of a host cell when introduced into the host cell and is replicated along with a chromosome of the genome, into which the vector has been integrated.

The above vector is preferably an expression vector. In the expression vector, the polynucleotide in accordance with an aspect of the present invention is functionally linked to elements necessary for transcription (such as a promoter). A promoter is a DNA sequence that exhibits transcription activity in a host cell, and the promoter can be selected as appropriate in accordance with a type of host.

A promoter that is operative in a bacterial cell is, for example, a promoter of *Bacillus stearothermophilus* maltogenic amylase gene, *Bacillus licheniformis* alpha-amylase gene, *Bacillus amyloliquefaciens* BAN amylase gene, *Bacillus Subtilis* alkaline protease gene, or *Bacillus pumilus* xylosldase gene; a PR or PL promoter of phage lambda; or a lac, trp, or tac promoter of *Escherichia coli*.

Examples of a promoter that is operative in an insect cell include a polyhedrin promoter, a P10 promoter, a basic protein promoter of *Autographa californica* nuclear polyhedrosis, a baculovirus immediate early gene 1 promoter, and a baculovirus 39K delayed early gene promoter. Examples of a promoter that is operative in a yeast cell include a promoter derived from a yeast glycolysis system gene, an alcohol dehydrogenase gene promoter, a TPI1 promoter, and an ADH2-4c promoter. Examples of a promoter that is operative in a mycotic cell include an ADH3 promoter and a tpiA promoter.

Examples of a promoter that is operative in a mammalian cell include an SV40 promoter, an MT-1 (metallothionein gene) promoter, and an adenovirus 2 major late promoter.

Further, if necessary, the polynucleotide in accordance with an aspect of the present invention may be functionally linked to a suitable terminator such as a human growth hormone terminator, or a TPI1 terminator or an ADH3 terminator for a fungal host. A recombinant vector in accordance with an aspect of the present invention may also have an element such as a polyadenylation signal, a transcription enhancer sequence, or a translation enhancer sequence.

The recombinant vector in accordance with an aspect of the present invention may also be provided with a DNA sequence that enables the vector to replicate inside the host cell, and examples thereof include an SV40 origin of replication (when the host cell is a mammalian cell).

The recombinant vector in accordance with an aspect of the present invention may also contain a selectable marker. Examples of the selectable marker include drug resistance genes such as ampicillin, kanamycin, tetracycline, chloramphenicol, neomycin, and hygromycin.

[4. Transformant]

A transformant can be produced by introducing, into a suitable host cell, the polynucleotide in accordance with an aspect of the present invention or the recombinant vector in accordance with an aspect of the present invention (collectively called a nucleic acid construct of an aspect of the present invention).

Examples of the host cell include a bacterial cell, a yeast cell, a fungal cell, and a higher eukaryotic cell.

Examples of the bacterial cell include Gram-positive bacteria such as *Bacillus* and *Streptomyces*, and Gram-negative bacteria such as *Escherichia coli*. Transformation of these bacterial cells may be performed by, for example, a protoplast method or a method in which a competent cell is used.

The yeast cell is, for example, a cell belonging to *Saccharomyces* or *Schizosaccharomyces*, and examples thereof include *Saccharomyces cerevisiae* and *Saccharomyces kluyveri*. Examples of a method for introducing the nucleic acid construct of an aspect of the present invention into a yeast host include electroporation, a spheroplast method, and a lithium acetate method.

Examples of the fungal cell other than the yeast cell include filamentous fungi such as cells belonging to *Aspergillus, Neurospora, Fusarium*, and *Trichoderma*. In a case where a filamentous fungus is used as the host cell, transformation can be performed by integrating the nucleic acid construct of an aspect of the present invention into a host chromosome and obtaining a recombinant host cell. Integration of the nucleic acid construct into the host chromosome can be performed by, for example, homologous recombination or heterologous recombination.

In a case where an insect cell is used as the host cell, a protein can be expressed by co-transfecting a recombinant gene transduction vector and a baculovirus into the insect cell so as to obtain a recombinant virus in an insect cell culture supernatant, and then infecting the insect cell with the recombinant virus. Examples of a co-transfection method include a calcium phosphate method and a lipofection method.

Examples of a mammalian cell include an HEK293 cell, a HeLa cell, a COS cell, a BHK cell, a CHL cell, and a CHO cell. For example, electroporation, the calcium phosphate method, or the lipofection method can be used for transformation of the mammalian cell.

The above transformant is cultured in a suitable culture medium under a condition that enables expression of the introduced nucleic acid construct. Next, the fluorescent protein in accordance with an aspect of the present invention is isolated and purified from a culture of the transformant as necessary.

Note that the transformant is not limited to a cell. Specifically, the transformant may be, for example, a tissue, an organ, or an individual that has been transformed with use of the nucleic acid construct in accordance with an aspect of the present invention. Note, however, that a transformant other than a cell may preferably be of a non-human origin, and is preferably of a non-human origin particularly in a case where the transformant is an individual.

[5. Fused Fluorescent Protein]

A fused fluorescent protein can be constructed by fusing the fluorescent protein in accordance with an aspect of the present invention with another protein. The kind of another protein to be fused with the fluorescent protein of an aspect of the present invention is not particularly limited. Examples of the another protein include a protein localized in a cell, more specifically, a protein specific to an intracellular organelle.

The fused fluorescent protein may also be constructed by fusing the fluorescent protein in accordance with an aspect of the present invention with a protein subjected to degradation by a proteasome such as degron. In a more specific example, the fused fluorescent protein may be constructed by using an acceptor protein as the fluorescent protein in accordance with an aspect of the present invention (e.g., a YFP) to fuse the acceptor protein, a donor protein (e.g., a CFP), and a protein subjected to degradation by a proteasome such as degron. For example, the fused fluorescent protein can be constructed by linking the acceptor protein, a degradation stopping peptide, a spacer peptide, the donor protein, and the degron in this order from the N-terminus side. In a case where the acceptor protein and the donor protein differ in fluorescent wavelength, fluorescence of two wavelengths is emitted when the degron is not subjected to degradation. When the degron is subjected to degradation, the donor protein that is linked to the N-terminus side of the degron is also subjected to degradation. In contrast, the acceptor protein is not subjected to degradation by the degradation stopping peptide, and only fluorescence that is emitted from the acceptor protein is observed. Thus, a degradation activity of the degron can be more accurately measured by measuring a change in fluorescence intensity of these two wavelengths. The degradation activity of the degron can also be measured with use of a fluorescence resonance energy transfer (FRET) method. Examples of the protein subjected to degradation by a proteasome, the degradation stopping peptide, and the spacer peptide are disclosed in, for example, International Publication No. WO2011/090159.

A method for obtaining a fused fluorescent protein in accordance with an aspect of the present invention is not particularly limited. The fused fluorescent protein may be chemically synthesized or may be produced by a gene recombination technique. In the case of producing the fused fluorescent protein by a gene recombination technique, for example, a polynucleotide that encodes a desired fused fluorescent protein can be obtained by ligating a polynucleotide of the fluorescent protein in accordance with an aspect of the present invention and a polynucleotide of another protein. The fused fluorescent protein in accordance with an aspect of the present invention can be produced by introducing the polynucleotide thus obtained into a suitable expression system.

By expressing the fused fluorescent protein in accordance with an aspect of the present invention in a cell and monitoring fluorescence emitted by the fused fluorescent protein, localization and a dynamic situation of the protein in the cell can be analyzed. That is, by using a fluorescent microscope to observe a cell that has been transformed or transfected with a polynucleotide encoding the fused fluorescent protein in accordance with an aspect of the present invention, localization and a dynamic situation of the protein in the cell can be visualized and analyzed.

For example, by analyzing localization and a dynamic situation of a protein that is specific to an intracellular organelle, distribution and movement of, for example, a nucleus, a mitochondrion, an endoplasmic reticulum, a Golgi body, a secretory vesicle, and a peroxisome can be observed. Moreover, since for example an axon and a dendrite of a nerve cell show a very complicated change in running direction in a developing individual, a dynamic analysis can be carried out by labeling such a site with fluorescence.

The type of the fluorescent microscope can be selected as appropriate in accordance with a purpose. In a case where frequent observations are necessary for, for example, tracing a change over time, an ordinary incident-light fluorescent microscope is preferable. In a case where resolution is to be increased as in a case where detailed intracellular localization is to be investigated, a confocal laser microscope is preferably used. As a microscope system, an inverted microscope is preferable in view of keeping a physiological state of a cell and preventing contamination. When an erecting microscope is used, an immersion lens can be used in the case of using a lens of high power.

A suitable filter set can be selected in accordance with a fluorescent wavelength of the fluorescent protein. A filter with excitation light of approximately 470 nm to 490 nm and fluorescence of approximately 500 nm to 520 nm is preferably used to observe a GFP. A filter with excitation light of approximately 480 nm to 500 nm and fluorescence of approximately 510 nm to 550 nm is preferably used to observe a YFP.

Moreover, a living cell that is observed over time with use of a fluorescent microscope needs to be photographed in a short period of time. Thus, a high sensitive cooled CCD camera is used. A cooled CCD camera allows a thermal noise to be reduced by cooling CCD and allows a weak fluorescent image to be clearly photographed by exposure for a short period of time.

The scope of the present invention also encompasses a method for analyzing localization or a dynamic situation of a protein in a cell by expressing, in the cell, the fused fluorescent protein in accordance with an aspect of the present invention.

[6. Method for Producing Fluorescent Protein]

The scope of the present invention also encompasses a method for producing the fluorescent protein in accordance with an aspect of the present invention (hereinafter may be abbreviated to "a production method in accordance with an aspect of the present invention"). The production method in accordance with an aspect of the present invention includes the step of substituting an amino acid residue (alanine residue) corresponding to position 206 of a GFP amino acid sequence with a phenylalanine residue. A substitution can be introduced by, for example, using a site-specific mutagenesis method such as a Kunkel method (Kunkel et al. (1985): Proc. Natl. Acad. Sci. USA, vol. 82, p. 488-) to artificially introduce a substitution into a polynucleotide encoding a polypeptide having a GFP amino acid sequence.

The scope of the present invention also encompasses a fluorescent protein obtained by the production method in accordance with an aspect of the present invention.

[7. Method for Analyzing Physiologically Active Substance]

The fluorescent protein in accordance with an aspect of the present invention can be used for a method in which a fluorescence resonance energy transfer (FRET) method is used to analyze a physiologically active substance. For example, in a case where the fluorescent protein in accordance with an aspect of the present invention is a mutant of a yellow fluorescent protein (YFP), the fluorescent protein in accordance with an aspect of the present invention is used as an acceptor protein (acceptor molecule), and a cyan fluorescent protein (CFP) is used as a donor protein (donor molecule). By causing fluorescence resonance energy transfer (FRET) between the acceptor protein and the donor protein, it is possible to visualize an interaction between the proteins. For example, an interaction between the proteins caused by an increase in concentration of calcium ions (for example, binding of a calcium binding protein such as calmodulin and its target peptide such as M13) can be visualized by FRET from the CFP to the YFP.

As described earlier, since the maturation time of the fluorescent protein in accordance with an aspect of the present invention is short, the fluorescent protein can be used to, for example, analyze a physiologically active substance that is involved in proceeding of a cell cycle.

[8. Kit]

A kit in accordance with an aspect of the present invention is a kit for analyzing localization of intracellular components and/or analyzing a physiologically active substance. The kit in accordance with an aspect of the present invention includes at least one kind selected from the group consisting of a fluorescent protein in accordance with an aspect of the present invention, a fused fluorescent protein in accordance with an aspect of the present invention, a polynucleotide in accordance with an aspect of the present invention, a recombinant vector in accordance with an aspect of the present invention, and a transformant in accordance with an aspect of the present invention. The kit in accordance with an aspect of the present invention can be prepared by a material and a method that are per se known and ordinarily used. Reagents such as a fluorescent protein and a polynucleotide can each be prepared in a form suitable for preservation by dissolving the reagent in a suitable solvent. Examples of the solvent include water, ethanol, and various buffer solutions.

Aspects of the present invention can also be expressed as follows:

In summary, in order to attain the object, the present invention includes the following features.

<1> A fluorescent protein having an amino acid sequence of a green fluorescent protein (GFP) derived from a crystal jelly or of a mutant fluorescent protein of the green fluorescent protein, the amino acid sequence having an amino acid residue substituted with a phenylalanine residue (alanine residue), the amino acid residue corresponding to position 206 with the amino acid sequence of the GFP used as a reference sequence.

<2> The fluorescent protein recited in <1>, wherein the amino acid sequence is the following (1) or (2):

(1) an amino acid sequence represented by any of SEQ ID NOS: 1 to 3 and 5; or (2) an amino acid sequence having a sequence identity of 90% or more with respect to the amino acid sequence defined in (1) above.

<3> The fluorescent protein recited in <1> or <2>, wherein the amino acid sequence further has a mutation in at least one selected from the group consisting of amino acid residues corresponding to position 30, position 39, position 69, position 70, position 128, position 129, and position 145 with the amino acid sequence of the GFP used as the reference sequence.

<4> The fluorescent protein recited in any one of <1> to <3>, wherein the fluorescent protein has at least one amino acid residue selected from the group consisting of the following (3) to (7):

(3) an amino acid residue being a phenylalanine residue, the amino acid residue corresponding to position 46 with the amino acid sequence of the GFP used as the reference sequence;

(4) an amino acid residue being a phenylalanine residue, the amino acid residue corresponding to position 64 with the amino acid sequence of the GFP used as the reference sequence;

(5) an amino acid residue being a methionine residue, the amino acid residue corresponding to position 153 with the amino acid sequence of the GFP used as the reference sequence;

(6) an amino acid residue being a valine residue, the amino acid residue corresponding to position 163 with the amino acid sequence of the GFP used as the reference sequence; and (7) an amino acid residue being a serine residue, the amino acid residue corresponding to position 175 with the amino acid sequence of the GFP used as the reference sequence.

<5> A polynucleotide encoding a fluorescent protein recited in any one of <1> to <4>. <6> A recombinant vector having a polynucleotide recited in <5>.

<7> A transformant having a polynucleotide recited in <5> or a recombinant vector recited in <6>.

<8> A fused fluorescent protein including a fluorescent protein recited in any one of <1> to <4> and another protein.

<9> A method for analyzing a physiologically active substance, including the step of carrying out fluorescence resonance energy transfer (FRET) by using, as an acceptor protein or a donor protein, a fluorescent protein recited in any one of <1> to <4>.

<10> A method for analyzing localization or a dynamic situation of a protein in a cell, including the step of expressing, in the cell, a fused fluorescent protein recited in <8>.

<11> A kit including at least one kind selected from the group consisting of a fluorescent protein recited in any one of <1> to <4>, a polynucleotide recited in <5>, a recombinant vector recited in <6>, a transformant recited in <7>, and a fused fluorescent protein recited in <8>.

The present invention is not limited to the embodiments, but can be altered by a skilled person in the art within the scope of the claims. The present invention also encompasses, in its technical scope, any embodiment derived by combining technical means disclosed in differing embodiments.

EXAMPLES

[Example 1] Preparation of Mutant

According to a previously reported protocol (Sawano, A. et al., (2000) Nucleic Acids Research 28, e78), mutations F46L/F64L/M153T/V163A/S175G were introduced into a fluorescent protein having an amino acid sequence represented by SEQ ID NO: 1. For the introduction, cDNA of an EYFP in pRSET$_B$ (pRSET$_B$ EYFP) was used as a starting material. A polynucleotide encoding a mutated EYFP having the mutations F46L/F64L/M153T/V163A/S175G (hereinafter called "Venus") was obtained by an oligonucleotide-directed mutagenesis.

Next, according to the above protocol, mutations S30R/Y39I/Q69A/C70V/I128S/D129G/Y145F/A206F were introduced into Venus. For the introduction, cDNA of Venus in pRSET$_B$ (pRSET$_B$ Venus) was used as a starting material. A polynucleotide encoding mutated Venus having the mutations S30R/Y39I/Q69A/C70V/I128S/D129G/Y145F/A206F (hereinafter called "Achilles") was obtained by the oligonucleotide-directed mutagenesis. An amino acid sequence of Achilles is represented by SEQ ID NO: 4. A base sequence of Achilles is represented by SEQ ID NO: 6.

Furthermore, according to the above protocol, the following mutated Achilles were produced.

Mutated Achilles in which no mutation is introduced into a serine residue at position 30

Mutated Achilles in which no mutation is introduced into a tyrosine residue at position 39

Mutated Achilles in which no mutation is introduced into a glutamine residue at position 69

Mutated Achilles in which no mutation is introduced into a cysteine residue at position 70

Mutated Achilles in which no mutation is introduced into an isoleucine residue at position 128

Mutated Achilles in which no mutation is introduced into an aspartic acid residue at position 129

Mutated Achilles in which no mutation is introduced into a tyrosine residue at position 145

Mutated Achilles in which no mutation is introduced into an alanine residue at position 206

Mutated Achilles in which no mutation is introduced into a phenylalanine residue at position 46

Mutated Achilles in which no mutation is introduced into a phenylalanine residue at position 64

Mutated Achilles in which no mutation is introduced into a methionine residue at position 153

Mutated Achilles in which no mutation is introduced into a valine residue at position 163

Mutated Achilles in which no mutation is introduced into a serine residue at position 175

Figure 1:
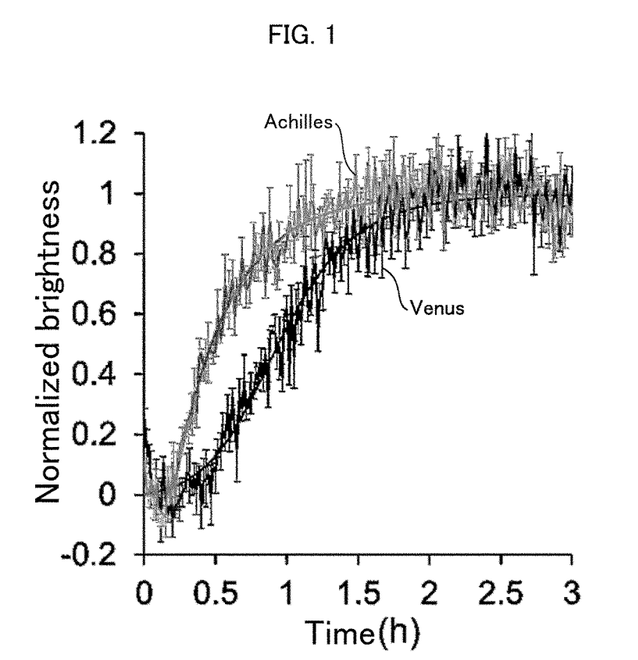
FIG. 1 is a graph showing a comparison of (a) fluorescence maturation during synthesis of a protein from mRNA of Achilles and (b) fluorescence maturation during synthesis of a protein from mRNA of Venus.

[Evaluation Example 1] Comparison of Fluorescence Maturation of Achilles and Fluorescence Maturation of Venus A comparison of a fluorescence maturation speed of Achilles during gene expression and a fluorescence maturation speed of Venus during gene expression was measured in a reconstituted cell-free expression system (PURE system). An mMESSAGE/mMACHINE SP6 kit was used to synthesize mRNA of each of Achilles and Venus. For a template, a plasmid was used in which together with a partial sequence (CCACCATGG) of a Kozak sequence, a polynucleotide of each of Achilles and Venus had been inserted into a BamHI/EcoRI site of a pCS2 vector and which had been made straight by NotI. The synthesized mRNA and a protein synthesis kit PureFrex 2.0 (Gene Frontier) were used to synthesize a protein. Fluorescent brightness was measured at 530 nm under 480 nm excitation in a plate reader Synergy Mx (BioTek) at 37° C. Measurement data was normalized by a steady-state value by using SigmaPlot 14 (Systat Software) to obtain an approximate curve of a 5-parameter sigmoid type. FIG. 1 shows a result of measurement of fluorescence brightness.

FIG. 1 shows an average and a standard error of three experimental trials. As shown in FIG. 1, a time constant required for brightness to reach 50% of final brightness was calculated, and it has been made clear that Achilles emits fluorescence in a time (in 29 minutes) approximately ½ faster than Venus (in 56 minutes).

[Evaluation Example 2] Comparison of Fluorescence Maturation of Achilles, Fluorescence Maturation of Venus, and Fluorescence Maturation of Mutated Achilles Regarding mutated Achilles in which no mutation was introduced into an amino acid at position 30, position 39, position 69, position 70, position 128, position 129, position 145, or position 206, fluorescence maturation of Achilles and fluorescence maturation of Venus were compared.

Figure 2:
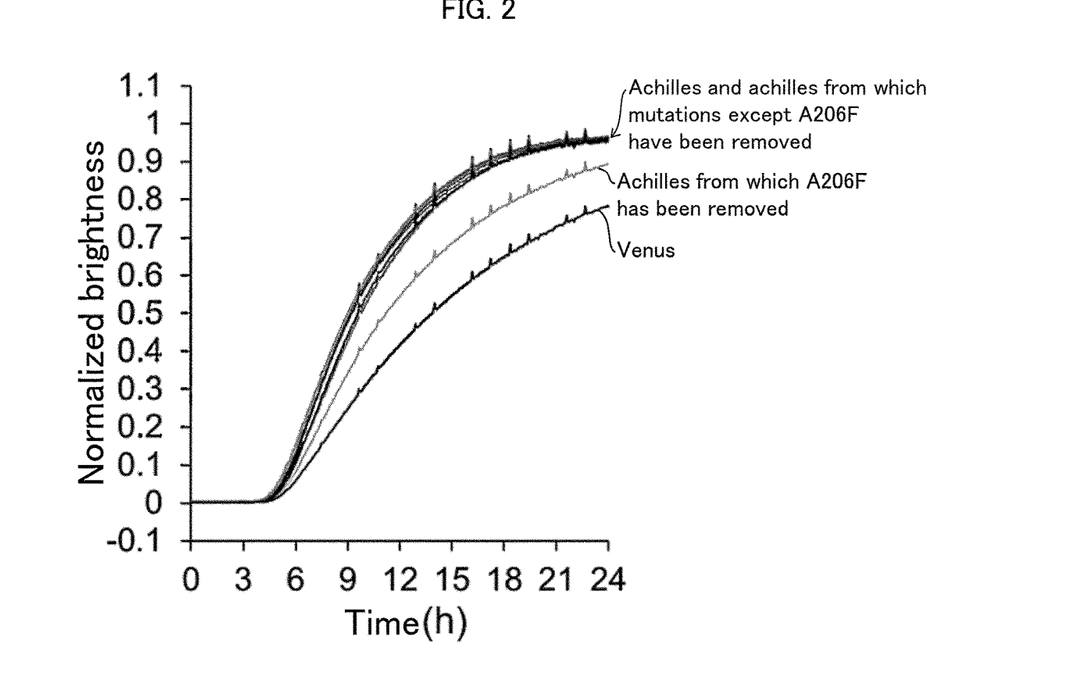
FIG. 2 is a graph showing a comparison of (a) fluorescence maturation in an *Escherichia coli* colony of Achilles, (b) fluorescence maturation in an *Escherichia coli* colony of a mutant of the Achilles, and (c) fluorescence maturation in an *Escherichia coli* colony of Venus.

A competent cell of an *Escherichia coli* JM109 (DE3) strain was transformed by a plasmid in which Achilles, the above eight mutants, and Venus had been inserted into a BamHI/EcoRI site of a pRSETB vector so as to be in-frame. Transformed *Escherichia coli* were dropped onto a plate so as to be seeded, and a time-lapse image was obtained at 37° C. A xenon light source (MAX-301, Asahi Spectra Co., Ltd.), a cooled CCD camera CoolSNAP HQ (Photometrics), an excitation filter (480AF30, Omega Optical, LLC), and an absorption filter (PB0540/020, Asahi Spectra Co., Ltd.) were used. Furthermore, MetaMorph software (Universal Imaging) was used to carry out control. Measurement data was normalized by an extrapolated steady-state value by using SigmaPlot 14 (Systat Software) to obtain an approximate curve of a 5-parameter sigmoid type. FIG. 2 shows a result of measurement of fluorescence brightness.

As shown in FIG. 2, it has turned out that A206F (a substitution of an alanine residue at position 206 with a phenylalanine residue) is the greatest cause of premature fluorescence in kinetics normalized by final brightness. It has been suggested that other mutations as a set also contribute to a residue of acceleration, though a contribution per mutation is small.

Figure 3:
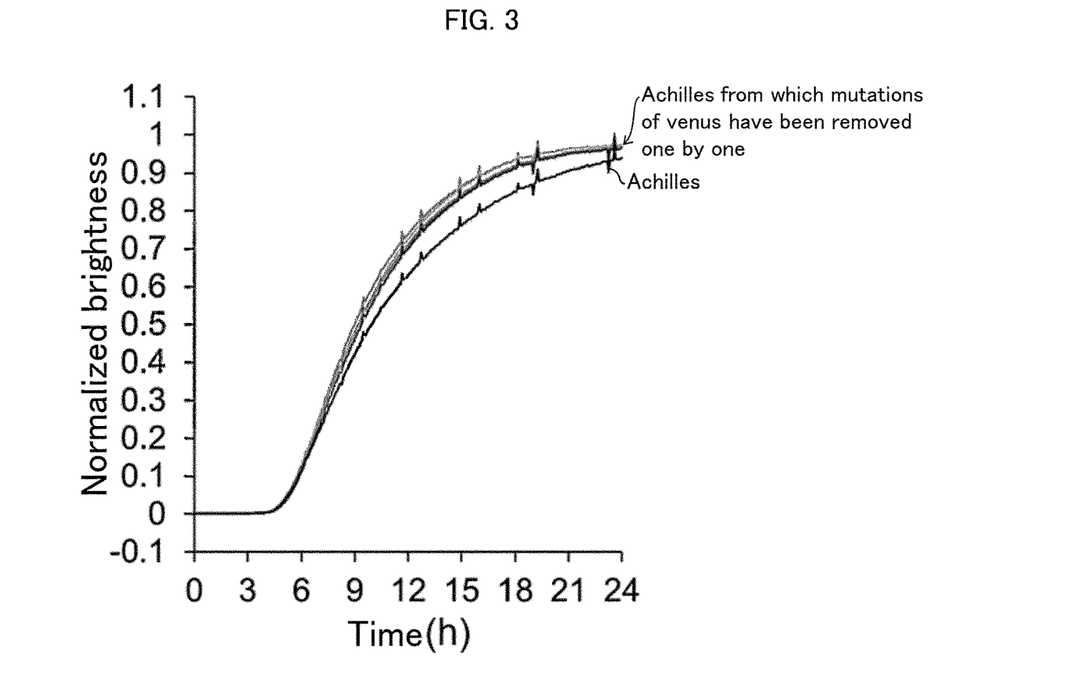
FIG. 3 is a graph showing a comparison of (a) fluorescence maturation in an *Escherichia coli* colony of Achilles, (b) fluorescence maturation in an *Escherichia coli* colony of a mutant of the Achilles, and (c) fluorescence maturation in an *Escherichia coli* colony of Venus.

[Evaluation Example 3] Comparison of Fluorescence Maturation of Achilles, Fluorescence Maturation of Venus, and Fluorescence Maturation of Mutated Achilles Regarding mutated Achilles in which no mutation was introduced into an amino acid at position 46, position 64, position 153, position 163, or position 175, fluorescence maturation of Achilles and fluorescence maturation of Venus were compared. Fluorescence maturation of Achilles and fluorescence maturation of Venus were compared by a method similar to that carried out in Evaluation Example 2. FIG. 3 shows a measurement result.

As shown in FIG. 3, it has been suggested that these mutations of Venus do not contribute to a maturation speed of Achilles in kinetics normalized by final brightness.

Figure 4:
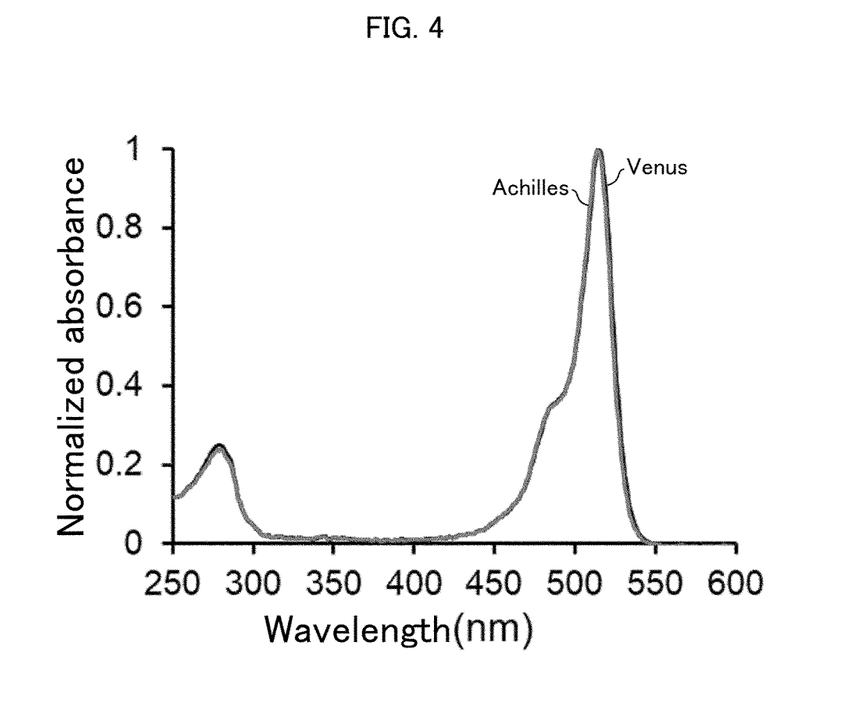
FIG. 4 is a graph showing absorption spectra of Achilles and Venus.
Figure 5:
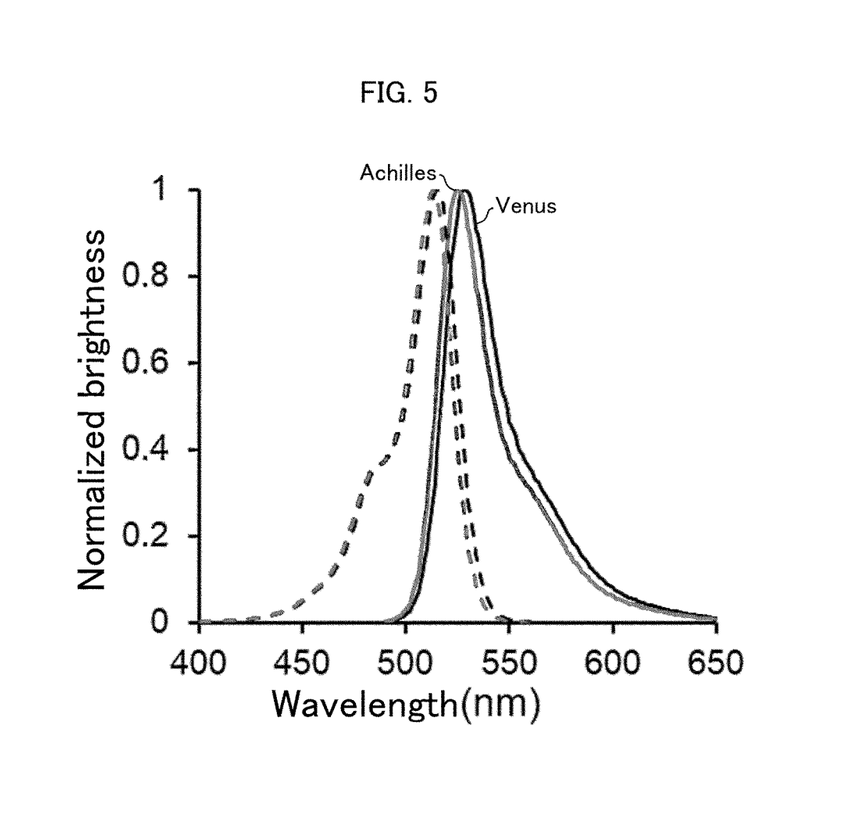
FIG. 5 is a graph showing excitation spectra (dotted lines) and fluorescence emission spectra (solid lines) of Achilles and Venus.

[Evaluation Example 4] Measurement of Fluorescence Characteristic of Achilles and Fluorescence Characteristic of Venus A competent cell of an *Escherichia coli* JM109 (DE3) strain was transformed by a plasmid in which Achilles and Venus had been inserted into a BamHI/EcoRI site of a pRSETB vector so as to be in-frame. Transformed *Escherichia coli* were subjected to shaking culture in an LB culture medium (at 37° C., at 180 rpm, for 17 hours). The *Escherichia coli* having been collected were dissolved, by freezing and thawing and ultrasonic treatment, in a PBS to which a 10 mg/mL lysozyme and protease inhibitor (10 μE-64, 10 μM leupeptin and 1 μM pepstatin A) had been added. Subsequently, Ni-NTA agarose was used to purify these fluorescent proteins tagged with His. Finally, a PD-10 column (GE Healthcare) was used to substitute the purified fluorescent proteins with a 50 mM HEPES-KOH (pH=7.4) buffer. A spectrophotometer U-3310 (Hitachi, Ltd.) was used to measure absorption spectra, and a microplate reader Synergy Mx (BioTek) was used to measure excitation and fluorescence emission spectra. A Bradford protein assay kit (Bio-Rad Laboratories, Inc.) was used to calculate a molar extinction coefficient from a protein concentration measured with BSA used as a standard. A system in which an integrating sphere C9920 (Hamamatsu Photonics K.K.) and a multichannel spectroscope C10027 (Hamamatsu Photonics K.K.) were used was used to measure a fluorescence quantum yield. FIGS. 4 and 5 show measurement results.

FIG. 4 is a graph showing absorption spectra of Achilles and Venus. FIG. 5 is a graph showing excitation spectra (dotted lines) and fluorescence emission spectra (solid lines) of Achilles and Venus. As shown in FIG. 4, Achilles and Venus had respective absorption peak wavelengths of 514 nm and 515 nm, which are substantially equal to each other. As shown in FIG. 5, Achilles and Venus had respective excitation peak wavelengths of 513 nm and 515 nm, which are substantially equal to each other, and respective fluorescence peak wavelengths of 525 nm and 528 nm, which are substantially equal to each other. Achilles and Venus had respective molar extinction coefficients of 110,000 mM$^{-1}$ cm$^{-1}$ and 116,000 mM$^{-1}$ cm$^{-1}$, which are substantially equal to each other, and respective fluorescence quantum yields of 0.64 and 0.56, which are substantially equal to each other.

INDUSTRIAL APPLICABILITY

A fluorescent protein of the present invention has a great maturation speed and can be used for, for example, life science research.

The invention claimed is:

1. A fluorescent protein having an amino acid residue substituted with a phenylalanine residue, the amino acid residue corresponding to position 206 with an amino acid sequence of a green fluorescent protein (GFP) derived from a crystal jelly used as a reference sequence, the amino acid sequence of the GFP used as the reference sequence being represented by SEQ ID NO: 5, the fluorescent protein having a sequence identity of 90% or more with respect to an amino acid sequence represented by any of SEQ ID Nos: 1 to 3 and 5.

2. The fluorescent protein as set forth in claim 1, wherein the amino acid sequence further has a mutation in at least one selected from the group consisting of amino acid residues corresponding to position 30, position 39, position 69, position 70, position 128, position 129, and position 145 with the amino acid sequence of the GFP used as the reference sequence.

3. The fluorescent protein as set forth in claim 1, wherein the fluorescent protein has at least one amino acid residue selected from the group consisting of the following (a) to (e):

(a) an amino acid residue being a phenylalanine residue, the amino acid residue corresponding to position 46 with the amino acid sequence of the GFP used as the reference sequence;

(b) an amino acid residue being a phenylalanine residue, the amino acid residue corresponding to position 64 with the amino acid sequence of the GFP used as the reference sequence;

(c) an amino acid residue being a methionine residue, the amino acid residue corresponding to position 153 with the amino acid sequence of the GFP used as the reference sequence;

(d) an amino acid residue being a valine residue, the amino acid residue corresponding to position 163 with the amino acid sequence of the GFP used as the reference sequence; and (e) an amino acid residue being a serine residue, the amino acid residue corresponding to position 175 with the amino acid sequence of the GFP used as the reference sequence.

4. A polynucleotide encoding a fluorescent protein recited in claim 1.

5. A recombinant vector having a polynucleotide recited in claim 4.

6. A transformant having a polynucleotide recited in claim 4.

7. A fused fluorescent protein comprising a fluorescent protein recited in claim 1 and another protein.

8. A method for analyzing a physiologically active substance, comprising the step of carrying out fluorescence resonance energy transfer (FRET) by using, as an acceptor protein or a donor protein, a fluorescent protein recited in claim 1.

9. A method for analyzing localization or a dynamic situation of a protein in a cell, comprising the step of expressing, in the cell, a fused fluorescent protein recited in claim 7.

10. A kit comprising at least one kind selected from the group consisting of a fluorescent protein recited in claim 1.

* * * * *

SEQUENCE LISTING

```
<160> NUMBER OF SEQ ID NOS: 6

<210> SEQ ID NO 1
<211> LENGTH: 239
<212> TYPE: PRT
<213> ORGANISM: Artificial Sequence
<220> FEATURE:
<223> OTHER INFORMATION: Recombinant Protein

<400> SEQUENCE: 1

Met Val Ser Lys Gly Glu Glu Leu Phe Thr Gly Val Val Pro Ile Leu
1               5                   10                  15

Val Glu Leu Asp Gly Asp Val Asn Gly His Lys Phe Ser Val Ser Gly
            20                  25                  30

Glu Gly Glu Gly Asp Ala Thr Tyr Gly Lys Leu Thr Leu Lys Phe Ile
        35                  40                  45

Cys Thr Thr Gly Lys Leu Pro Val Pro Trp Pro Thr Leu Val Thr Thr
    50                  55                  60

Leu Thr Tyr Gly Val Gln Cys Phe Ser Arg Tyr Pro Asp His Met Lys
65                  70                  75                  80
```

```
Gln His Asp Phe Phe Lys Ser Ala Met Pro Glu Gly Tyr Val Gln Glu
            85                  90                  95

Arg Thr Ile Phe Phe Lys Asp Asp Gly Asn Tyr Lys Thr Arg Ala Glu
            100                 105                 110

Val Lys Phe Glu Gly Asp Thr Leu Val Asn Arg Ile Glu Leu Lys Gly
            115                 120                 125

Ile Asp Phe Lys Glu Asp Gly Asn Ile Leu Gly His Lys Leu Glu Tyr
            130                 135                 140

Asn Tyr Asn Ser His Asn Val Tyr Ile Met Ala Asp Lys Gln Lys Asn
145                 150                 155                 160

Gly Ile Lys Val Asn Phe Lys Ile Arg His Asn Ile Glu Asp Gly Ser
            165                 170                 175

Val Gln Leu Ala Asp His Tyr Gln Gln Asn Thr Pro Ile Gly Asp Gly
            180                 185                 190

Pro Val Leu Leu Pro Asp Asn His Tyr Leu Ser Thr Gln Ser Ala Leu
            195                 200                 205

Ser Lys Asp Pro Asn Glu Lys Arg Asp His Met Val Leu Leu Glu Phe
            210                 215                 220

Val Thr Ala Ala Gly Ile Thr Leu Gly Met Asp Glu Leu Tyr Lys
225                 230                 235

<210> SEQ ID NO 2
<211> LENGTH: 239
<212> TYPE: PRT
<213> ORGANISM: Artificial Sequence
<220> FEATURE:
<223> OTHER INFORMATION: Recombinant Protein

<400> SEQUENCE: 2

Met Val Ser Lys Gly Glu Glu Leu Phe Thr Gly Val Val Pro Ile Leu
1               5                   10                  15

Val Glu Leu Asp Gly Asp Val Asn Gly His Lys Phe Ser Val Ser Gly
            20                  25                  30

Glu Gly Glu Gly Asp Ala Thr Tyr Gly Lys Leu Thr Leu Lys Phe Ile
            35                  40                  45

Cys Thr Thr Gly Lys Leu Pro Val Pro Trp Pro Thr Leu Val Thr Thr
50                  55                  60

Phe Gly Tyr Gly Leu Gln Cys Phe Ala Arg Tyr Pro Asp His Met Lys
65                  70                  75                  80

Gln His Asp Phe Phe Lys Ser Ala Met Pro Glu Gly Tyr Val Gln Glu
            85                  90                  95

Arg Thr Ile Phe Phe Lys Asp Asp Gly Asn Tyr Lys Thr Arg Ala Glu
            100                 105                 110

Val Lys Phe Glu Gly Asp Thr Leu Val Asn Arg Ile Glu Leu Lys Gly
            115                 120                 125

Ile Asp Phe Lys Glu Asp Gly Asn Ile Leu Gly His Lys Leu Glu Tyr
            130                 135                 140

Asn Tyr Asn Ser His Asn Val Tyr Ile Met Ala Asp Lys Gln Lys Asn
145                 150                 155                 160

Gly Ile Lys Val Asn Phe Lys Ile Arg His Asn Ile Glu Asp Gly Ser
            165                 170                 175

Val Gln Leu Ala Asp His Tyr Gln Gln Asn Thr Pro Ile Gly Asp Gly
            180                 185                 190

Pro Val Leu Leu Pro Asp Asn His Tyr Leu Ser Tyr Gln Ser Ala Leu
            195                 200                 205
```

Ser Lys Asp Pro Asn Glu Lys Arg Asp His Met Val Leu Leu Glu Phe
210                 215                 220

Val Thr Ala Ala Gly Ile Thr Leu Gly Met Asp Glu Leu Tyr Lys
225                 230                 235

<210> SEQ ID NO 3
<211> LENGTH: 239
<212> TYPE: PRT
<213> ORGANISM: Artificial Sequence
<220> FEATURE:
<223> OTHER INFORMATION: Recombinant Protein

<400> SEQUENCE: 3

Met Val Ser Lys Gly Glu Glu Leu Phe Thr Gly Val Val Pro Ile Leu
1               5                   10                  15

Val Glu Leu Asp Gly Asp Val Asn Gly His Lys Phe Ser Val Ser Gly
                20                  25                  30

Glu Gly Glu Gly Asp Ala Thr Tyr Gly Lys Leu Thr Leu Lys Phe Ile
            35                  40                  45

Cys Thr Thr Gly Lys Leu Pro Val Pro Trp Pro Thr Leu Val Thr Thr
50                  55                  60

Leu Gly Tyr Gly Leu Gln Cys Phe Ala Arg Tyr Pro Asp His Met Lys
65                  70                  75                  80

Gln His Asp Phe Phe Lys Ser Ala Met Pro Glu Gly Tyr Val Gln Glu
                85                  90                  95

Arg Thr Ile Phe Phe Lys Asp Asp Gly Asn Tyr Lys Thr Arg Ala Glu
            100                 105                 110

Val Lys Phe Glu Gly Asp Thr Leu Val Asn Arg Ile Glu Leu Lys Gly
        115                 120                 125

Ile Asp Phe Lys Glu Asp Gly Asn Ile Leu Gly His Lys Leu Glu Tyr
130                 135                 140

Asn Tyr Asn Ser His Asn Val Tyr Ile Thr Ala Asp Lys Gln Lys Asn
145                 150                 155                 160

Gly Ile Lys Ala Asn Phe Lys Ile Arg His Asn Ile Glu Asp Gly Gly
                165                 170                 175

Val Gln Leu Ala Asp His Tyr Gln Gln Asn Thr Pro Ile Gly Asp Gly
            180                 185                 190

Pro Val Leu Leu Pro Asp Asn His Tyr Leu Ser Tyr Gln Ser Ala Leu
        195                 200                 205

Ser Lys Asp Pro Asn Glu Lys Arg Asp His Met Val Leu Leu Glu Phe
210                 215                 220

Val Thr Ala Ala Gly Ile Thr Leu Gly Met Asp Glu Leu Tyr Lys
225                 230                 235

<210> SEQ ID NO 4
<211> LENGTH: 239
<212> TYPE: PRT
<213> ORGANISM: Artificial Sequence
<220> FEATURE:
<223> OTHER INFORMATION: Recombinant Protein

<400> SEQUENCE: 4

Met Val Ser Lys Gly Glu Glu Leu Phe Thr Gly Val Val Pro Ile Leu
1               5                   10                  15

Val Glu Leu Asp Gly Asp Val Asn Gly His Lys Phe Ser Val Arg Gly
                20                  25                  30

Glu Gly Glu Gly Asp Ala Thr Ile Gly Lys Leu Thr Leu Lys Leu Ile
            35                  40                  45

Cys Thr Thr Gly Lys Leu Pro Val Pro Trp Pro Thr Leu Val Thr Thr
            50                  55                  60

Leu Gly Tyr Gly Leu Ala Val Phe Ala Arg Tyr Pro Asp His Met Lys
 65                  70                  75                  80

Gln His Asp Phe Phe Lys Ser Ala Met Pro Glu Gly Tyr Val Gln Glu
                     85                  90                  95

Arg Thr Ile Phe Phe Lys Asp Asp Gly Asn Tyr Lys Thr Arg Ala Glu
                100                 105                 110

Val Lys Phe Glu Gly Asp Thr Leu Val Asn Arg Ile Glu Leu Lys Gly
            115                 120                 125

Ser Gly Phe Lys Glu Asp Gly Asn Ile Leu Gly His Lys Leu Glu Tyr
        130                 135                 140

Asn Phe Asn Ser His Asn Val Tyr Ile Thr Ala Asp Lys Gln Lys Asn
145                 150                 155                 160

Gly Ile Lys Ala Asn Phe Lys Ile Arg His Asn Ile Glu Asp Gly Gly
                165                 170                 175

Val Gln Leu Ala Asp His Tyr Gln Gln Asn Thr Pro Ile Gly Asp Gly
            180                 185                 190

Pro Val Leu Leu Pro Asp Asn His Tyr Leu Ser Tyr Gln Ser Phe Leu
        195                 200                 205

Ser Lys Asp Pro Asn Glu Lys Arg Asp His Met Val Leu Leu Glu Phe
210                 215                 220

Val Thr Ala Ala Gly Ile Thr Leu Gly Met Asp Glu Leu Tyr Lys
225                 230                 235

<210> SEQ ID NO 5
<211> LENGTH: 238
<212> TYPE: PRT
<213> ORGANISM: Aequorea victoria

<400> SEQUENCE: 5

Met Ser Lys Gly Glu Glu Leu Phe Thr Gly Val Val Pro Ile Leu Val
  1               5                  10                  15

Glu Leu Asp Gly Asp Val Asn Gly His Lys Phe Ser Val Ser Gly Glu
                 20                  25                  30

Gly Glu Gly Asp Ala Thr Tyr Gly Lys Leu Thr Leu Lys Phe Ile Cys
             35                  40                  45

Thr Thr Gly Lys Leu Pro Val Pro Trp Pro Thr Leu Val Thr Thr Phe
 50                  55                  60

Ser Tyr Gly Val Gln Cys Phe Ser Arg Tyr Pro Asp His Met Lys Gln
 65                  70                  75                  80

His Asp Phe Phe Lys Ser Ala Met Pro Glu Gly Tyr Val Gln Glu Arg
                 85                  90                  95

Thr Ile Phe Phe Lys Asp Asp Gly Asn Tyr Lys Thr Arg Ala Glu Val
                100                 105                 110

Lys Phe Glu Gly Asp Thr Leu Val Asn Arg Ile Glu Leu Lys Gly Ile
            115                 120                 125

Asp Phe Lys Glu Asp Gly Asn Ile Leu Gly His Lys Leu Glu Tyr Asn
        130                 135                 140

Tyr Asn Ser His Asn Val Tyr Ile Met Ala Asp Lys Gln Lys Asn Gly
145                 150                 155                 160

Ile Lys Val Asn Phe Lys Ile Arg His Asn Ile Glu Asp Gly Ser Val
                165                 170                 175

Gln Leu Ala Asp His Tyr Gln Gln Asn Thr Pro Ile Gly Asp Gly Pro

```
                    180                 185                 190
Val Leu Leu Pro Asp Asn His Tyr Leu Ser Thr Gln Ser Ala Leu Ser
            195                 200                 205

Lys Asp Pro Asn Glu Lys Arg Asp His Met Val Leu Leu Glu Phe Val
        210                 215                 220

Thr Ala Ala Gly Ile Thr His Gly Met Asp Glu Leu Tyr Lys
225                 230                 235

<210> SEQ ID NO 6
<211> LENGTH: 720
<212> TYPE: DNA
<213> ORGANISM: Artificial Sequence
<220> FEATURE:
<223> OTHER INFORMATION: Recombinant DNA

<400> SEQUENCE: 6
atggtgagca agggcgagga gctgttcacc ggggtggtgc ccatcctggt cgagctggac        60
ggcgacgtaa acggccacaa gttcagcgtg cgcggcgagg gcgagggcga tgccaccatc      120
ggcaagctga ccctgaagct gatctgcacc accggcaagc tgcccgtgcc ctggcccacc      180
ctcgtgacca ccctgggcta cggcctggcc gtcttcgccc gctacccga ccacatgaag       240 cagcacgact tcttcaagtc cgccatgccc gaaggctacg tccaggagcg caccatcttc      300
ttcaaggacg acggcaacta caagacccgc gccgaggtga agttcgaggg cgacaccctg      360
gtgaaccgca tcgagctgaa gggctccggc ttcaaggagg acggcaacat cctggggcac     420
aagctggagt acaacttcaa cagccacaac gtctatatca ccgccgacaa gcagaagaac      480
ggcatcaagg ccaacttcaa gatccgccac aacatcgagg acggcggcgt gcagctcgcc      540
gaccactacc agcagaacac ccccatcggc gacggccccg tgctgctgcc cgacaaccac      600
tacctgagct accagtcctt cctgagcaaa gaccccaacg agaagcgcga tcacatggtc      660
ctgctggagt tcgtgaccgc cgccgggatc actctcggca tggacgagct gtacaagtaa     720
```